(12) United States Patent
Boegner et al.

(10) Patent No.: US 6,168,764 B1
(45) Date of Patent: *Jan. 2, 2001

(54) METHOD AND CATALYST FOR REDUCING POLLUTANTS IN GASES

(75) Inventors: Walter Boegner, Remseck (DE); Christine De Saint-Aubin, Strasbourg (FR)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/996,154

(22) Filed: Dec. 22, 1997

(30) Foreign Application Priority Data

Dec. 12, 1996 (DE) .............................. 196 53 910

(51) Int. Cl.⁷ .................................. B01J 29/064
(52) U.S. Cl. .................... 422/177; 422/168; 422/171; 502/71; 502/77; 502/78; 502/325
(58) Field of Search ................... 423/212, 213.2, 423/239.1, 239.2; 422/168, 180, 177, 171; 502/64–66, 77–78, 325, 71

(56) References Cited

U.S. PATENT DOCUMENTS

| | | | |
|---|---|---|---|
| 4,151,123 | 4/1979 | McCann | 423/213.2 |
| 5,125,231 | * 6/1992 | Patil et al. | 60/274 |
| 5,260,035 | * 11/1993 | Lachman et al. | 422/180 |
| 5,407,651 | * 4/1995 | Kawai | 423/213.2 |
| 5,433,933 | 7/1995 | Eshita et al. | 423/213.2 |
| 5,587,137 | * 12/1996 | Swaroop et al. | 423/239.2 |
| 5,736,114 | * 4/1998 | Barthe et al. | 423/213.2 |
| 5,804,155 | * 9/1998 | Farrauto et al. | 423/239.2 |

FOREIGN PATENT DOCUMENTS

| | | | |
|---|---|---|---|
| 36 35 284 | 4/1988 | (DE) . | |
| 42 26 112 | 2/1994 | (DE) . | |
| 44 45 945 C1 | 8/1996 | (DE) . | |
| 0 018 117 | 10/1980 | (EP) . | |
| 0 148 048 | 7/1985 | (EP) . | |
| 0 602 963 A1 | * 12/1993 | (EP) | B01D/53/36 |
| 0 671 208 A1 | 9/1995 | (EP) . | |
| 1065435 | 4/1967 | (GB) . | |
| 2-268810 | * 11/1990 | (JP) . | |
| 3-213150 | * 9/1991 | (JP) . | |
| 5-084441 | * 4/1993 | (JP) . | |

OTHER PUBLICATIONS

WPI Abstract, JP 7096195 A, Seiji Harufuji et al., Nov. 4, 1995.

* cited by examiner

*Primary Examiner*—Hien Tran
(74) *Attorney, Agent, or Firm*—Evenson, McKeown, Edwards & Lenahan, P.L.L.C.

(57) ABSTRACT

A catalyst and method is provided for reducing pollutants in gases. The catalyst is composed of two substances. A first material which is an adsorption material has an adsorbent effect on an additional substance, the additional substance often being a hydrocarbon, such as propene. A second material is an oxidation material. The oxidation material has an oxidizing effect on the pollutant. The adsorption material and the oxidation material are on the same catalyst.

9 Claims, 7 Drawing Sheets

METHOD AND CATALYST FOR REDUCING POLLUTANTS IN GASES

BACKGROUND AND SUMMARY OF THE INVENTION

This application claims the priority of German Application No. 196 53 910.2, the disclosure of which is expressly incorporated by reference herein.

The invention relates to a method and a catalyst for reducing pollutants in gases.

It is known from DE 44 45 945 C1 to use catalysts for reducing nitrogen oxides, said catalysts containing two materials. The reduction of the nitrogen oxides takes place in the presence of hydrocarbons (HC) as reducing agents. The two materials however have a low catalytic effect as far as nitrogen oxides are concerned. A first material, namely titanium mordenite, acts adsorptively with respect to the HCs, while the second material, composed of metal oxides, acts adsorptively toward the nitrogen oxides. In a catalyst prepared from these materials, there is an up to 50% reduction of nitrogen oxides in the range between 200° C. and 450° C.

The goal of the invention is to provide a novel method and a corresponding novel catalyst whose advantages are comparable to those known from DE 44 45 945 C1.

The goal is achieved according to the invention by a method and catalyst that adsorbs hydrocarbons as a reducing agent and decreases nitrogen oxides.

A mixture of two materials is proposed for the catalyst according to the invention, with the first material, referred to hereinbelow as the adsorption material, having an adsorbent effect on the additional substance, and with the second material, hereinafter called the oxidation material, having an oxidizing effect on the pollutant.

When two materials that preferably have a slightly active effect catalytically as far as the pollutant is concerned are used as the adsorption material and the oxidation material, it is surprising that good catalytic reduction of at least one pollutant nevertheless takes place preferably in a gas containing oxygen.

Hydrocarbons are preferably used as the additional substance. Preferably nitrogen oxides are removed as the pollutants, which are at least temporarily oxidized with the aid of the oxidizing material to form $NO_2$. Possibly, the $NO_2$ is then converted to nitrogen ($N_2$) and additional substances with the aid of hydrocarbon that is released by the adsorption material and/or not absorbed by the absorption material.

H-zeolites are preferably used as the adsorption material, H-ZSM5 or H-mordenite for example. Metal oxides are preferably used as the oxidation materials, with the term "metal oxides" also covering mixed metal oxides, for example spinels, especially the metal oxide $Al_2O_3$ and the like and/or perovskites in accordance with the present patent application.

Further logical embodiments of the invention can be found in the subclaims. Moreover, the invention will now be described in greater detail with reference to examples. In the figures, graphs have been provided for the various examples, with the concentration of $NO_x$ and/or $CO_2$ and/or propene ($C_3H_6$) being plotted as a function of temperature (in ° C.).

Other objects, advantages and novel features of the present invention will become apparent from the following detailed description of the invention when considered in conjunction with the accompanying drawings.

DETAILED DESCRIPTION OF THE DRAWINGS

Figure 1:
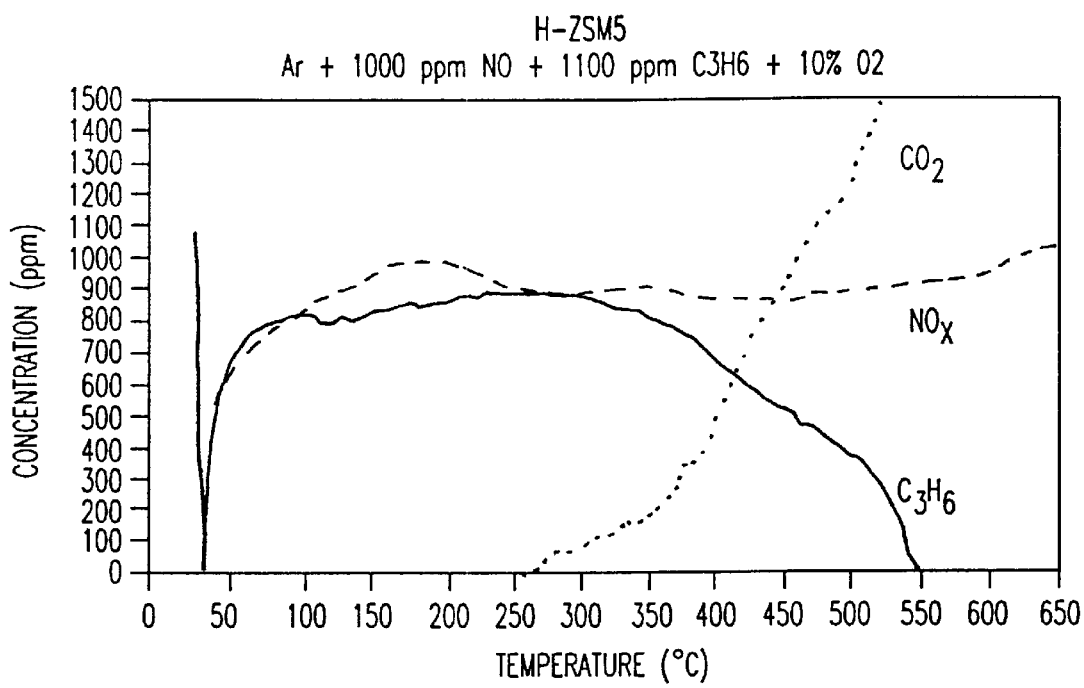
FIG. 1 is a graph of the NO, HC, and $CO_2$ concentrations of a gas downstream from an H-zeolite (H-ZSM5) as a function of temperature, with the gas upstream of the zeolite containing argon, NO, propene, and oxygen.

In the graph according to FIG. 1, the curve shows the concentration of NO, HC, and $CO_2$ in a gas as a function of temperature, said gas having flowed through an H-zeolite (H-ZSM5) that can be used as an adsorption agent. Before flowing through the catalyst, the gas contained argon, 1000 ppm NO, 10% $O_2$, and 1100 ppm propene as the HC component.

Figure 2:
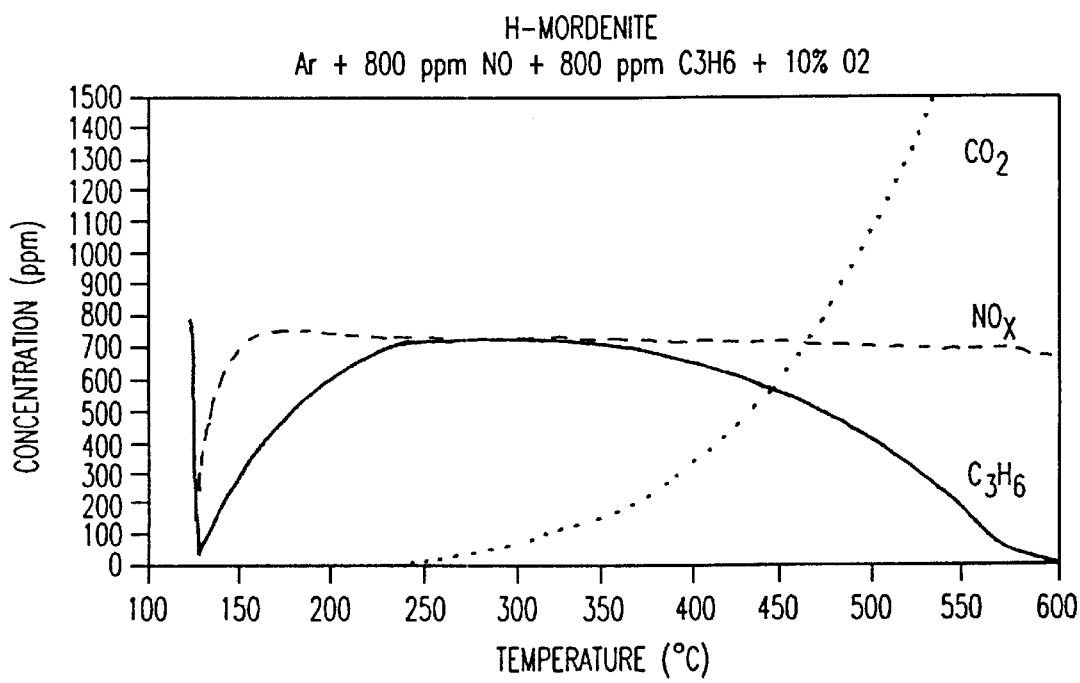
FIG. 2 is a graph of the NO, HC, and $CO_2$ concentrations of a gas downstream from an H-mordenite as a function of temperature, with the gas containing argon, NO, propene, and oxygen upstream from the H-mordenite.

In the graph in FIG. 2, the curve shows the concentration of NO, HC, and $CO_2$ in a gas as a function of temperature after said gas has flowed through an H-mordenite that can be used as an adsorption material. Before passing through the catalyst, the gas contained argon, 800 ppm NO, 10% $O_2$, and 800 ppm propene.

In the graphs in FIGS. 1 and 2, the HC concentration at temperatures below 200° C. remains significantly below the value for the respective initial concentration of propene. This difference can be attributed to adsorption of HC by the adsorption material.

Above a temperature of about 300° C., there is a sharp drop in HC concentration accompanied by a simultaneous steady increase in $CO_2$ concentration. The two effects just mentioned can be attributed to HC oxidation that rises with temperature. The $No_x$ concentration varies only slightly from the initial concentration above approximately 150° C., with the deviations that occur below 150° C. being attributed to an adsorption of $NO_x$ that takes place at the outset.

The graphs in FIGS. 1 and 2 show that both H-ZSM5 and H-mordenite can cause HC adsorption, for which reason they can be used as adsorption materials in accordance with the invention. A nitrogen oxide reduction reaction cannot be catalyzed by these two adsorption materials, however.

Figure 3:
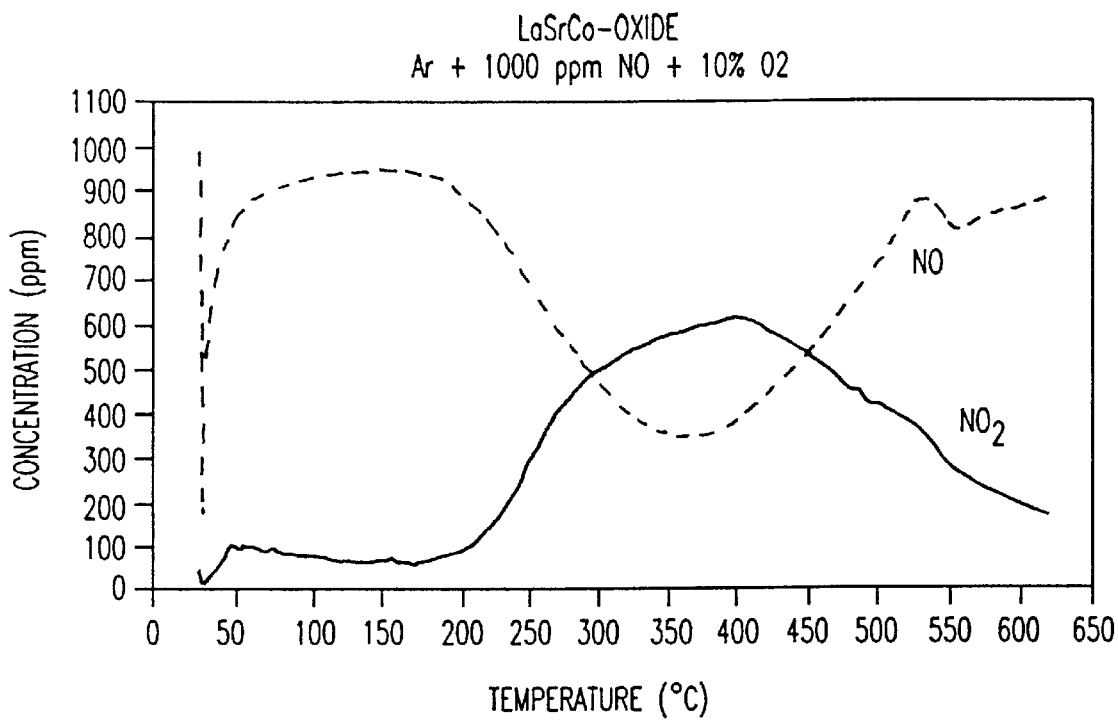
FIG. 3 is a graph of the NO and $NO_2$ concentrations of a gas downstream from an LaSrCo oxide as a function of temperature, with the gas containing argon, NO, and oxygen upstream from the LaSrCo oxide.

In the graph according to FIG. 3, the curve showing the concentrations of NO and $NO_2$ in a gas is plotted as a function of temperature, said gas having flowed through a metal oxide that can be used as an oxidizing agent, specifically LaSrCo oxide. Before passing through the catalyst, the gas contained argon, 1000 ppm NO, and 10% $O_2$.

Figure 4:
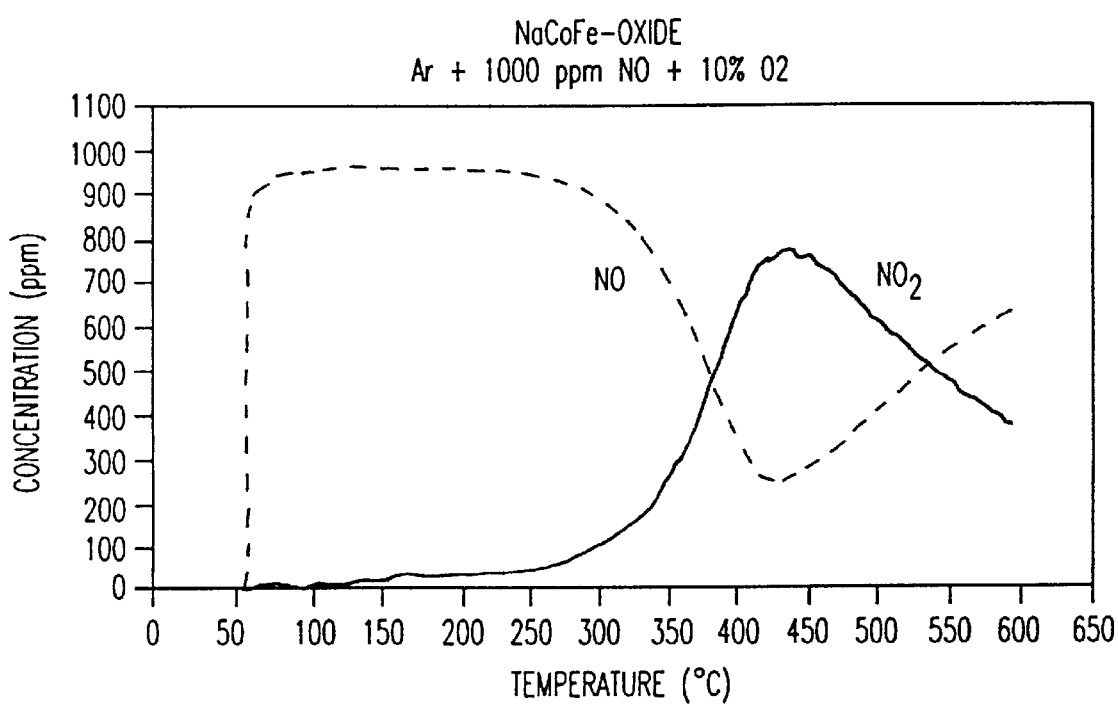
FIG. 4 is a graph of the NO and $NO_2$ concentrations of a gas downstream from an NaCoFe oxide as a function of temperature, with the gas containing argon, NO, and oxygen upstream of the NaCoFe oxide.

In the graph in FIG. 4, the curve showing the concentrations of NO and $NO_2$ in a gas is plotted as a function of temperature, said gas having flowed through a metal oxide that can be used as oxidation material, namely NaCoFe oxide. Before passing through the catalyst, the gas contained argon, 1000 ppm NO, and 10% $O_2$.

Figure 5:
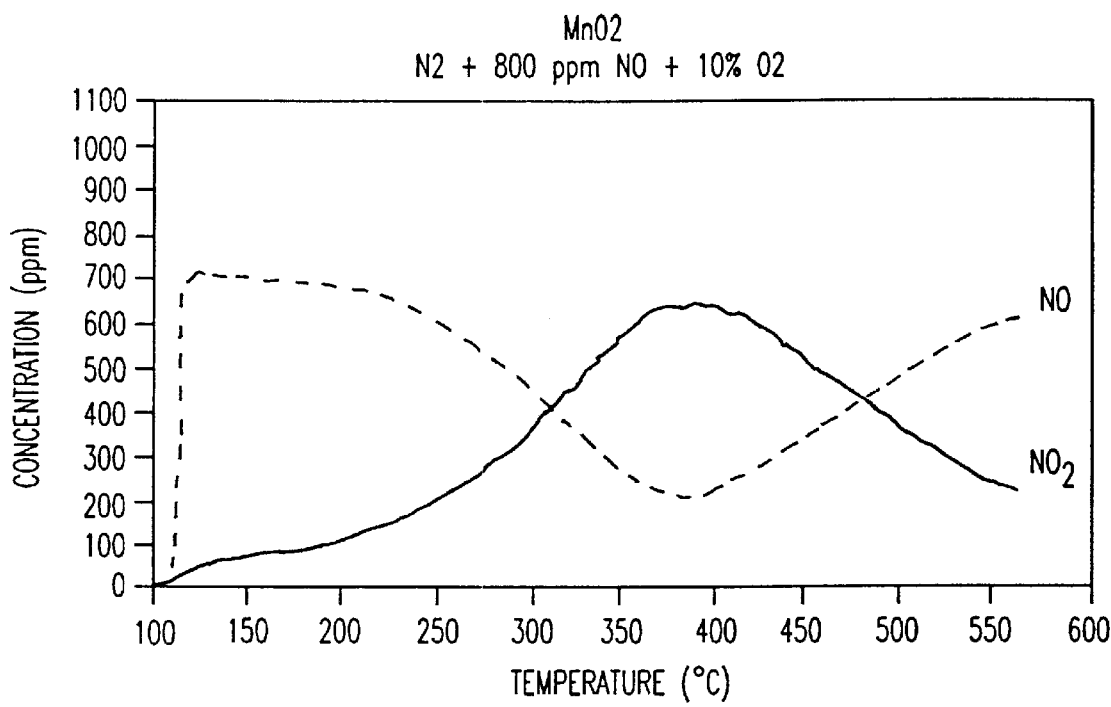
FIG. 5 is a graph of the NO and $NO_2$ concentrations of a gas downstream from an Mn oxide as a function of temperature, with the gas containing $N_2$, NO, and oxygen upstream from the Mn oxide.

In the graph according to FIG. 5, the graph of the concentration of NO and $NO_2$ of a gas is plotted as a function of temperature, said gas having flowed through a metal oxide that can be used as an oxidation material, namely Mn oxide. Before passing through the catalyst, the gas contained $N_2$, 800 ppm NO, and 10% $O_2$.

Figure 6:
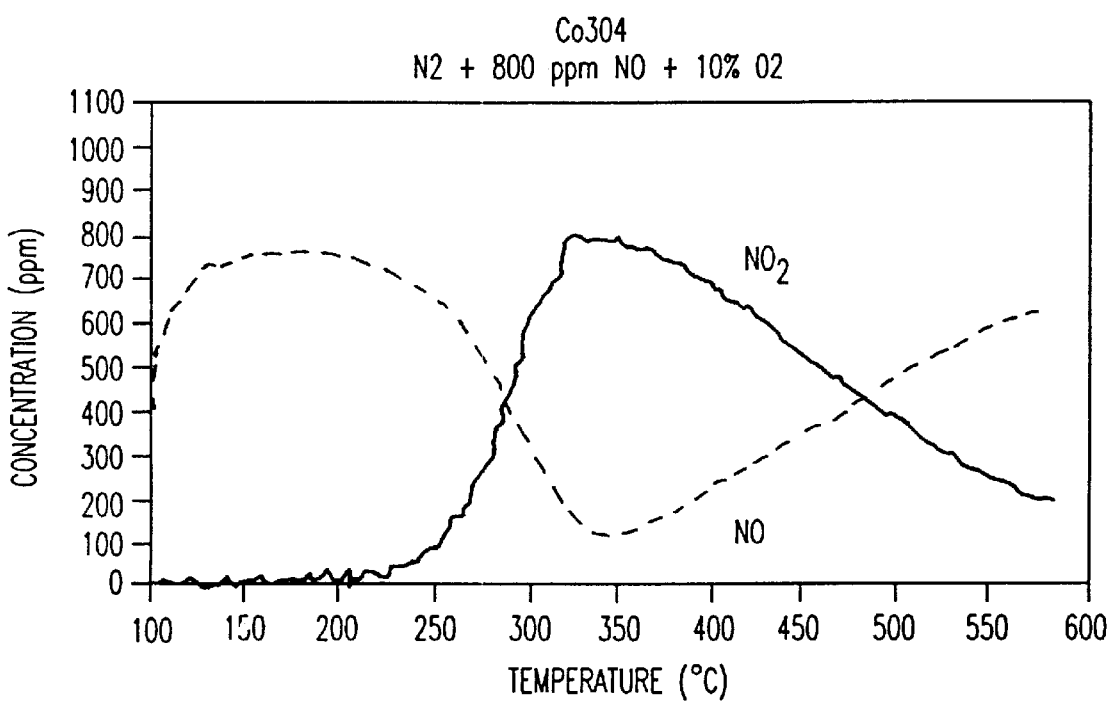
FIG. 6 is a graph is a graph of the NO and $NO_2$ concentrations of a gas downstream of a Co oxide as a function of temperature, with the gas containing $N_2$, NO, and oxygen upstream from the Co oxide.

In the graph according to FIG. 6, the curve of the concentration of NO and $NO_2$ of a gas is plotted as a function of temperature, said gas having passed through a metal oxide that can be used as an oxidation material, namely Co oxide. Before passing through the catalyst, the gas contained $N_2$, 800 ppm NO, and 10% $O_2$.

In the graphs in FIGS. 3 to 6 that relate to a plurality of metal oxides that differ both in the elements used and the number of elements used, there is a pronounced oxidation of NO into $NO_2$ in a temperature range between approximately 300° C. and 450° C. The oxidizing effect of these metal oxides can be seen from the graphs in which the NO concentration decreases sharply, while there is a corresponding large increase in $NO_2$ concentration at the same time. These metal oxide compounds are consequently good oxidation materials in accordance with the invention.

In order to investigate the catalytic behavior of these metal oxides or mixed metal oxides regarding selective reduction of NO with HC in gases containing oxygen, the metal oxides were exposed in further studies to a gas containing NO and $O_2$, said gas also having an HC, namely propene, added to it as a reducing agent.

Figure 7:
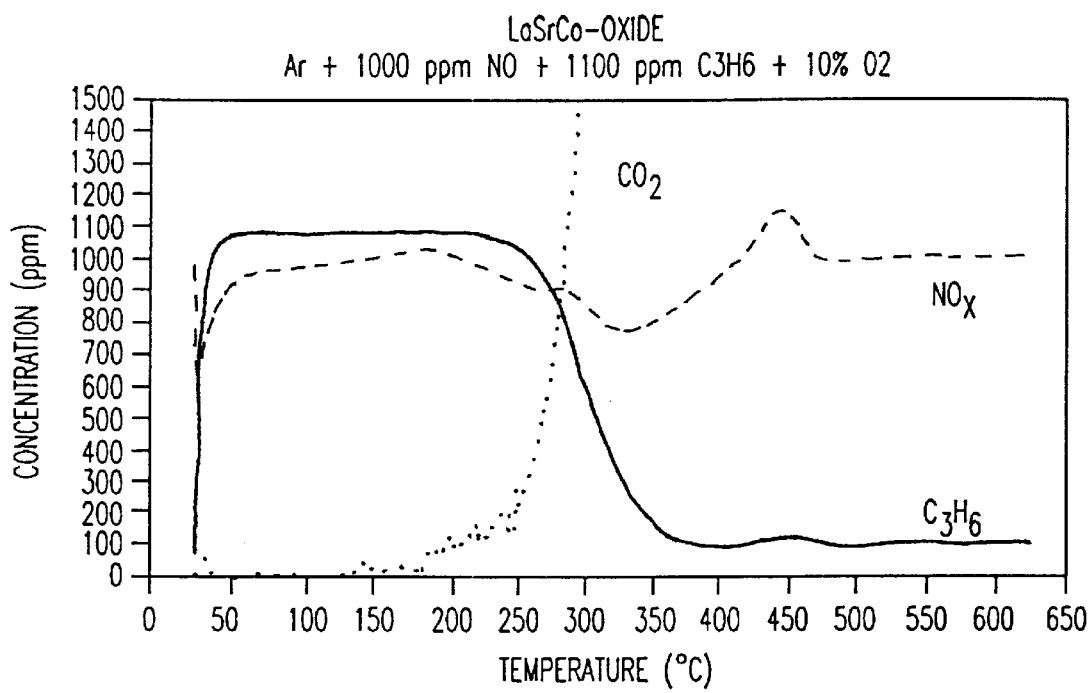
FIG. 7 is a graph of the $CO_2$, $NO_x$, and $C_3H_6$ concentrations of a gas downstream from an LaSrCo oxide as a function of temperature, with the gas containing argon, NO, $C_3H_6$, and oxygen upstream from the LaSrCo oxide.
Figure 8:
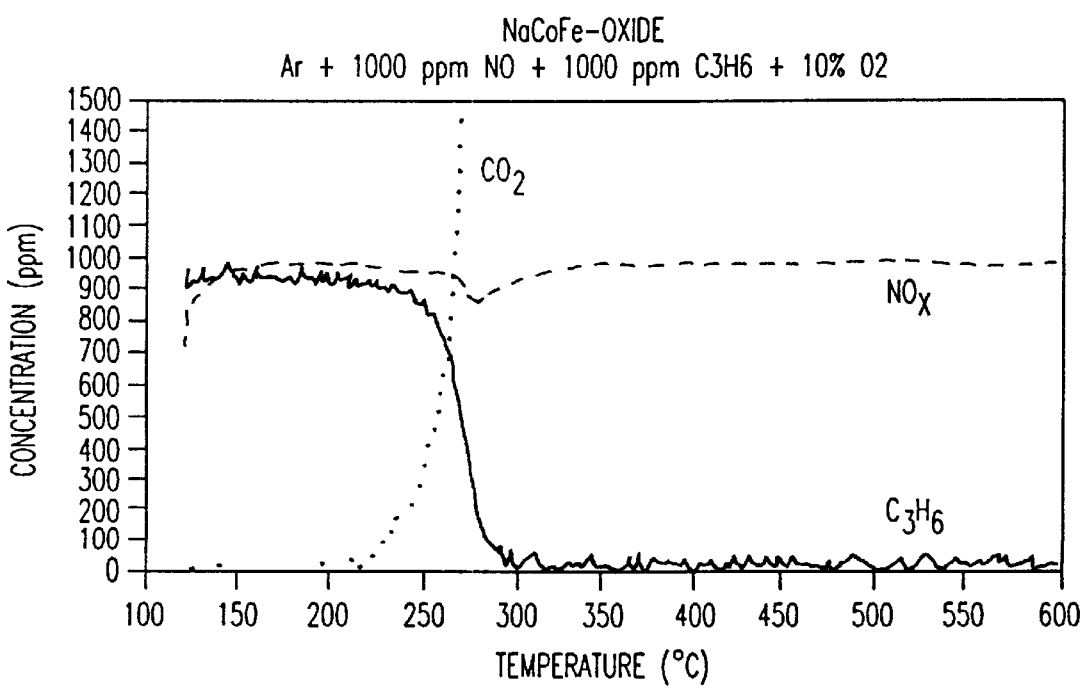
FIG. 8 is a graph of the $CO_2$, NOx, and $C_3H_6$ concentrations of a gas downstream from an NaCoFe oxide as a function of temperature, with the gas containing argon, NO, $C_3H_6$, and oxygen upstream from the NaCoFe oxide.

The results are shown in the graphs in FIGS. 7 to 10, wherein the sequence of metal oxides is the same as in FIGS. 3 to 6; in other words, the graph in FIG. 3 relates to the same mixed metal oxide as FIG. 7, the graph in FIG. 4 relates to the same mixed metal oxide as FIG. 8, and so on.

In the graphs in FIGS. 7 to 10, the curves showing the concentrations of $NO_x$ and propene ($C_3H_6$) are plotted as a function of temperature, with the corresponding curve for $CO_2$ also being plotted in FIGS. 7 and 8.

In all of these graphs, there is a sharp drop in $C_3H_6$ concentration at temperatures between 250° C. and 350° C. as a consequence of the oxidation of the hydrocarbon $C_3H_6$. At the same time, as can be seen in FIGS. 7 and 8, corresponding concentrations of the oxidation product $CO_2$ can be detected.

Figure 9:
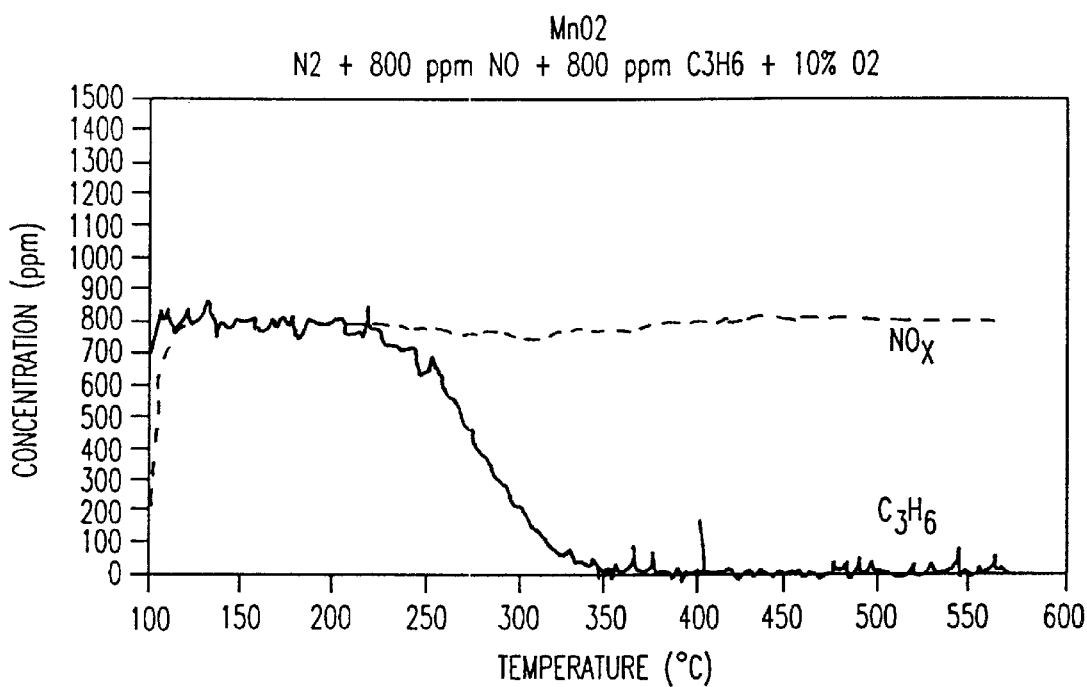
FIG. 9 is a graph of the $NO_x$ and $C_3H_6$ concentrations of a gas downstream from an Mn oxide as a function of temperature, with the gas containing NO, $C_3H_6$, and oxygen upstream from the Mn oxide.
Figure 10:
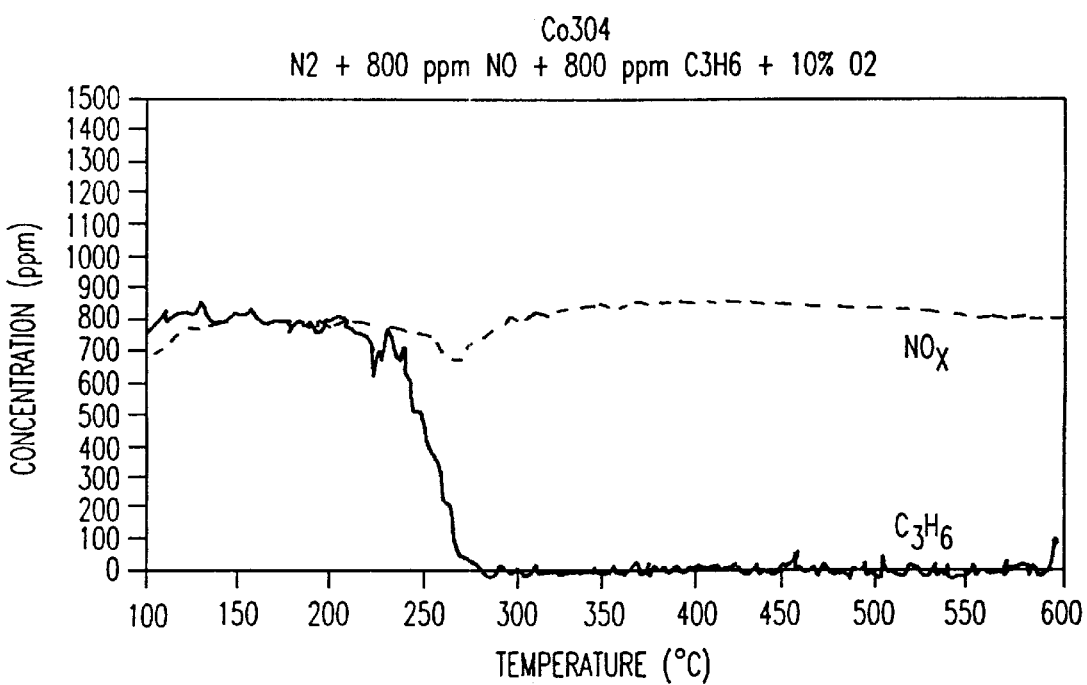
FIG. 10 is a graph of the $NO_x$ and $C_3H_6$ concentrations of a gas downstream from a Co oxide as a function of temperature, with the gas containing $N_2$, NO, and $C_3H_6$ upstream from the Co oxide.

In the case of the oxidation materials NaCoFe oxide, $MnO_2$, and $Co_3O_4$, as can be seen from FIGS. 8 to 10, the $NO_x$ concentration remains practically constant in the flow downstream from the oxidation materials at the NO concentration measured in the flow upstream of the oxidation materials. From this, it is quite clear that the oxidation materials cannot reduce NO in gas containing HC and oxygen.

In the case of the oxidation material LaSrCo oxide, (see FIG. 7) there is a slight drop in $NO_x$ concentration in the temperature range around 320° C. The drop is caused by adsorption of $NO_x$. A corresponding increase in $NO_x$ concentration can be attributed to an almost equivalent desorption of $NO_x$ at about 420° C. Therefore, there is no catalytic reduction of $NO_x$ in this oxidation material.

Generally speaking, all of these oxidation materials are good materials for oxidation of NO to $NO_2$. In no case do they act as catalysts for nitrogen oxides in gases that contain oxygen and hydrocarbons, such as the gases that occur in particular as exhaust in lean-running internal combustion engines.

EXAMPLE 1

Figure 11:
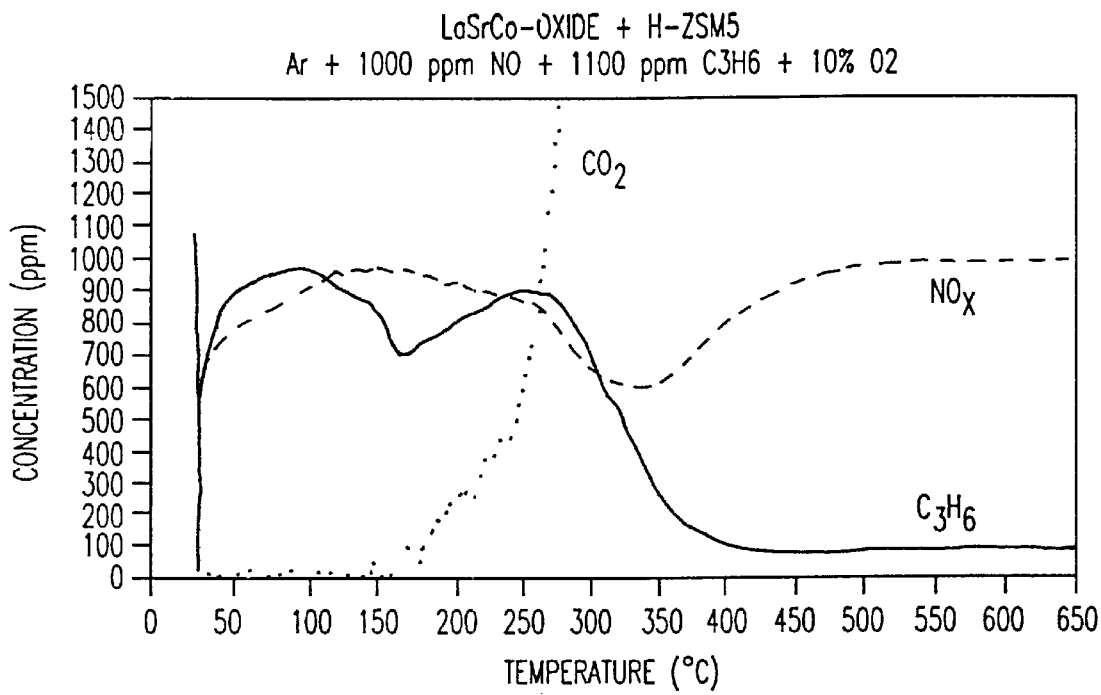
FIG. 11 is a graph of an $CO_2$, $NO_x$, and $C_3H_6$ concentration of a gas downstream from an H-zeolite mixed with LaSrCo oxide as a function of temperature, with the gas containing argon, NO, $C_3H_6$ and oxygen upstream from the zeolite/LaSrCo oxide mixture.

FIG. 11 shows a graph of $CO_2$, $NO_x$, and $C_3H_6$ concentration as a function of temperature, upstream of a catalyst according to the invention that is composed of a mixture of LaSrCo oxide and an H-zeolite (H-ZSM5). To study the catalyst, a gas was supplied to the catalyst that was composed of argon, 1000 ppm NO, 1100 ppm $C_3H_6$ and 10% oxygen.

In the graph in FIG. 11, there is a drop in HC concentration caused by adsorption at temperatures above 160° C. At temperatures above 260° C., there is also a drop in HC concentration, but in this case it is due to oxidation, as is particularly evident from the simultaneous increase in a corresponding oxidation product, $CO_2$. Reduction of $NO_x$ was measured at temperatures between 200° C. and about 400° C, with the low point in this case being approximately 320° C. and 60% of the NO concentration upstream.

In the presence of HC and oxygen, the present catalyst therefore exhibits good reduction of nitrogen oxides. This is especially surprising because none of the materials used in this catalyst is significantly effective catalytically with respect to reduction of nitrogen oxides.

EXAMPLE 2

Figure 12:
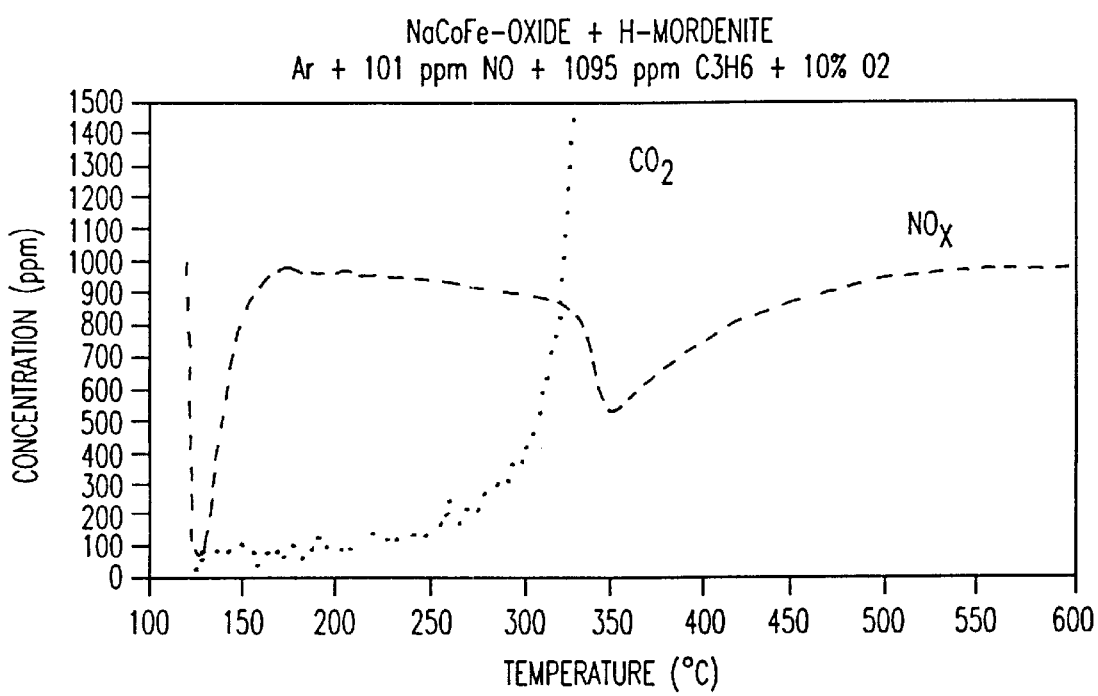
FIG. 12 is a graph of the $CO_2$, $NO_x$, $C_3H_6$ concentrations of a gas downstream from an H-mordenite mixed with an NaCoFe oxide as a function of temperature, with the gas containing argon, NO, $C_3H_6$, and oxygen upstream from the mordenite/NaCoFe oxide mixture.

FIG. 12 shows a graph of $CO_2$ and $NO_x$ concentration as a function of temperature, as measured downstream from a catalyst according to the invention, said catalyst being composed of a mixture of NaCoFe oxide with an H-mordenite. To study the catalyst, a gas composed of argon, 1011 ppm NO, 1095 $C_3H_6$, and 10% oxygen was supplied to the catalyst.

In the graph according to FIG. 12, reduction of $NO_x$ was measured at temperatures between approximately 250° C. and approximately 500° C., with the low point in this case being at approximately 350° C. and 50% of the NO concentration upstream.

The catalyst in this case, in the presence of HC and oxygen, also exhibits good reduction of nitrogen oxides. This is also surprising since in this case as well, none of the materials used in this catalyst is significantly effective catalytically for reducing nitrogen oxides.

EXAMPLE 3

Figure 13:
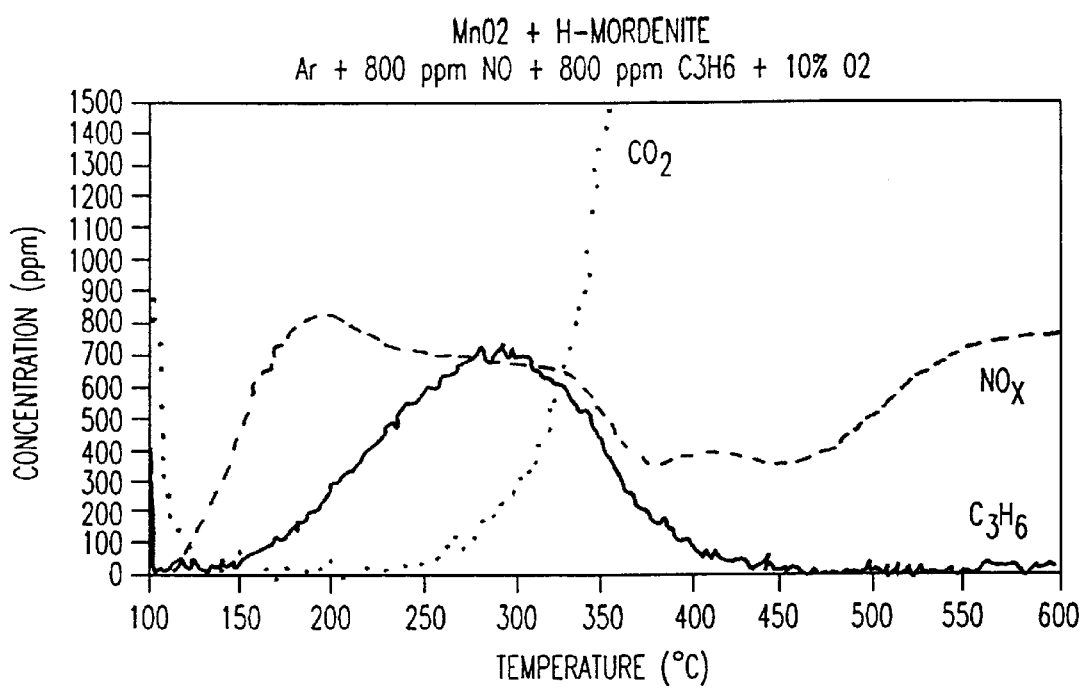
FIG. 13 is a graph of the $CO_2$, and $NO_x$, and $C_3H_6$ concentrations of a gas downstream from an H-mordenite mixed with Mn oxide as a function of temperature, with the gas containing argon, NO, $C_3H_6$, and oxygen upstream of the mordenite/Mn oxide mixture.

FIG. 13 shows a graph of $CO_2$, $NO_x$, and $C_3H_6$ concentration as a function of temperature, as determined downstream from a catalyst according to the invention, said catalyst being composed of a mixture of Mn oxide with an H-mordenite. To study the catalyst, a gas composed of argon, 800 ppm NO, 800 ppm $C_3H_6$, and 10% oxygen was supplied to the catalyst.

In this catalyst, in the temperature range between approximately 370 and 470° C., there was an approximately 50% catalytic reduction in nitrogen oxides. At temperatures below 180° C., reduction of the initial concentration of NO was observed, and can be attributed to adsorption of the nitrogen oxides.

In this case also, the catalyst, exhibits good reduction of nitrogen oxides in the presence of HC and oxygen, and these materials have hardly any effect catalytically as far as reducing nitrogen oxide is concerned when used for the catalyst.

EXAMPLE 4

Figure 14:
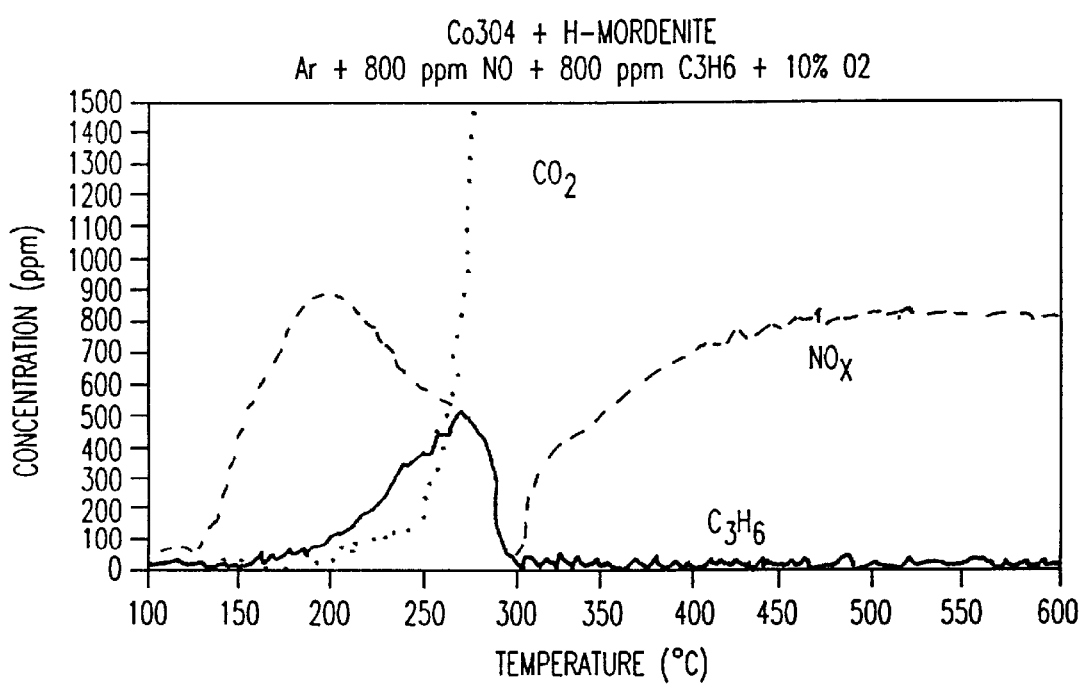
FIG. 14 is a graph of the $CO_2$, $NO_x$, and $C_3H_6$ concentrations of a gas downstream from an H-mordenite mixed with Co oxide as a function of temperature, with the gas containing argon, NO, $C_3H_6$, and oxygen upstream of the mordenite/Co oxide mixture.

FIG. 14 shows a graph of $CO_2$, $NO_x$, and $C_3H_6$ concentration as a function of temperature, as found downstream from a catalyst according to the invention that is composed of a mixture of Co oxide and an H-mordenite. To investigate the catalyst, a gas composed of argon, 800 ppm NO, 800 ppm $C_3H_6$, and 10% oxygen was supplied to said catalyst.

At temperatures below approximately 180° C. or 230° C., a decrease in $NO_x$ and $C_3H_6$ adsorption was observed with increasing temperature. In parallel with the increasing formation of the $C_3H_6$ oxidation product $CO_2$ above approximately 230° C. with rising temperature, catalytic reduction of $NO_x$ occurs that has its low point at approximately 290° C. and at approximately 5% of the NO concentration upstream.

In the latter example as well, the catalyst exhibits good reduction of nitrogen oxides in the presence of HC and oxygen, although these materials when used for the catalyst are only slightly effective as far as reducing nitrogen oxides catalytically is concerned.

It follows from the situation explained in Examples 1 to 4 and FIGS. 1 to 14 that a mixture of at least one adsorption material and one oxidation material can produce an effective catalyst. In particular, these materials, viewed separately, do not exert any catalytic reducing action on pollutants, preferably $NO_x$. It should be mentioned expressly here once again that the materials that can be used can be formed from several elements in the periodic system, including those not mentioned in the present document.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:
1. An apparatus for decreasing nitrogen oxides in gases comprising:
   a) an adsorption material comprising a first material of a catalyst for adsorbing hydrocarbons, and
   b) at least one oxidation material comprising a second material of the catalyst for oxidizing the nitrogen oxides to form $NO_2$;
   wherein released hydrocarbons from the adsorption material reduce the $NO_2$ to form $N_2$, and
   wherein the adsorption material and said at least one oxidation material are each catalytically inactive with respect to the reduction of nitrogen oxides,
   wherein the oxidation material is NaFeCo oxide.
2. The apparatus according to claim 1, wherein the adsorption material and the oxidation material are mixed together.
3. The apparatus according to claim 1, wherein the adsorption material is a zeolite.
4. The apparatus according to claim 3, wherein the zeolite is at least one of H-ZSM5 and H-mordenite.
5. The apparatus according to claim 1, wherein the adsorption material adsorbs hydrocarbons within a temperature range between 21° C. and 400° C.
6. The apparatus according to claim 1, said apparatus being used between a temperature of 0° C. and 500° C.
7. The apparatus according to claim 1, said apparatus being used in an oxygen-rich atmosphere.
8. The apparatus according to claim 1, wherein the catalyst is used in the exhaust systems of internal combustion engines.
9. The apparatus according to claim 1, wherein the catalyst is used in the exhaust systems of lean-running engines.

* * * * *